Oct. 2, 1928.
E. W. ENGLE
1,686,316
RECTIFIER ELECTRODE
Filed Jan. 7, 1927
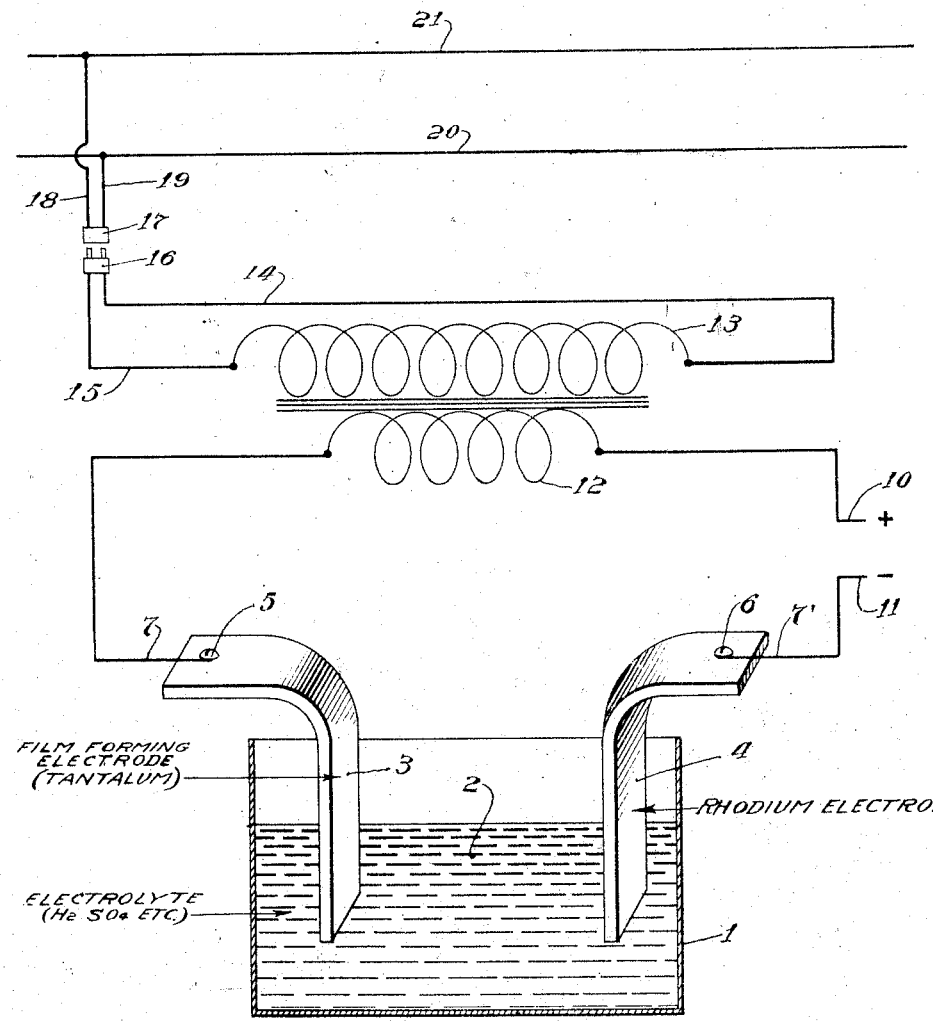
Inventor:
Edgar W. Engle
By: Williams, Bradbury,
McCaleb & Hinkle
Atty's Patented Oct. 2, 1928.

1,686,316

UNITED STATES PATENT OFFICE.

EDGAR W. ENGLE, OF LAKE FOREST, ILLINOIS, ASSIGNOR TO FANSTEEL PRODUCTS COMPANY, INC., OF NORTH CHICAGO, ILLINOIS, A CORPORATION OF NEW YORK.

RECTIFIER ELECTRODE.

Application filed January 7, 1927. Serial No. 159,521.

My invention relates to improvements in rectifier electrodes and is applicable especially to the continuous, silent and permanent type of electrolytic battery chargers such as that illustrated and described in my former Patent No. 1,495,582, issued May 27, 1924, and reissued as No. 16,438, on October 12, 1926.

The object of the invention is to provide a non-film forming electrode which will not disintegrate or decompose when subjected to continuous use, which will be efficient in operation and which will enhance the life of the battery charger. I have discovered that rhodium possesses remarkable and unexpected qualities and that unlike platinum, platinum-iridium, carbon and lead, it is not appreciably decomposed by the acid electrolyte, by the gases formed, or by electrolytic action.

A further object is to provde an improved method of electrolytic rectification by the use of this improved electrode.

Other objects and advantages will appear from time to time as the description of the invention progresses.

A preferred embodiment of the invention is illustrated in the accompanying drawing which diagrammatically illustrates the electrolytic battery charger. A receptacle 1, of suitable acid-proof material, contains an electrolyte 2, preferably sulphuric acid (specific gravity 1.200). To the electrolyte, a suitable salt such as ferrous sulphate may be added to decrease the internal resistance of the cell, if desired. In this solution are suspended, by any suitable means, a film-forming electrode 3 and a rhodium electrode 4. The film forming electrode 3 is preferably a tantalum strip or ribbon with an immersed area of about .37 square inches. However, it is to be understood that any suitable film forming electrode may be used and that the area may be varied under different conditions. By the use of the term "rhodium" both the pure metal and alloys, such as commercial rhodium, which contains iridium, and alloys with lead, platinum, etc., are included. The strips or ribbons of tantalum and rhodium are bent, as shown in the drawing, and secured to terminals 5 and 6. Connectors 7 and 7' are attached to said terminals and form the secondary circuit of a transformer. The connector 10 from the tantalum electrode should be secured to the positive pole of the battery to be charged and the connector 11 to the negative. The transformer is diagrammatically shown as including the secondary coil 12 and the primary coil 13 which is connected by wires 14 and 15 to a plug 16 adapted to be inserted in a socket 17 connected by leads 18 and 19 to the source of current represented by wires 20 and 21.

It is understood, of course, that the above embodiment is given by way of example only and I do not limit myself to the specific modification shown. I include all improvements and modifications that fall within the scope of the following claims.

I claim:

1. In electrolytic apparatus, a non-film forming electrode comprising rhodium, a film forming electrode and an electrolyte.

2. In an electrolytic rectifier, the combination of a rhodium electrode, a tantalum electrode and an electrolyte.

3. In an electrolytic rectifier, the combination of a rhodium electrode, a tantalum electrode and a sulphuric acid electrolyte.

4. In an electrolytic device, a rhodium electrode, a tantalum electrode and a sulphuric acid electrolyte, to which has been added a small amount of a metal of the iron group.

In witness whereof, I hereunto subscribe my name this 5th day of January, 1927.

EDGAR W. ENGLE.